United States Patent Office 3,419,159
Patented Dec. 31, 1968

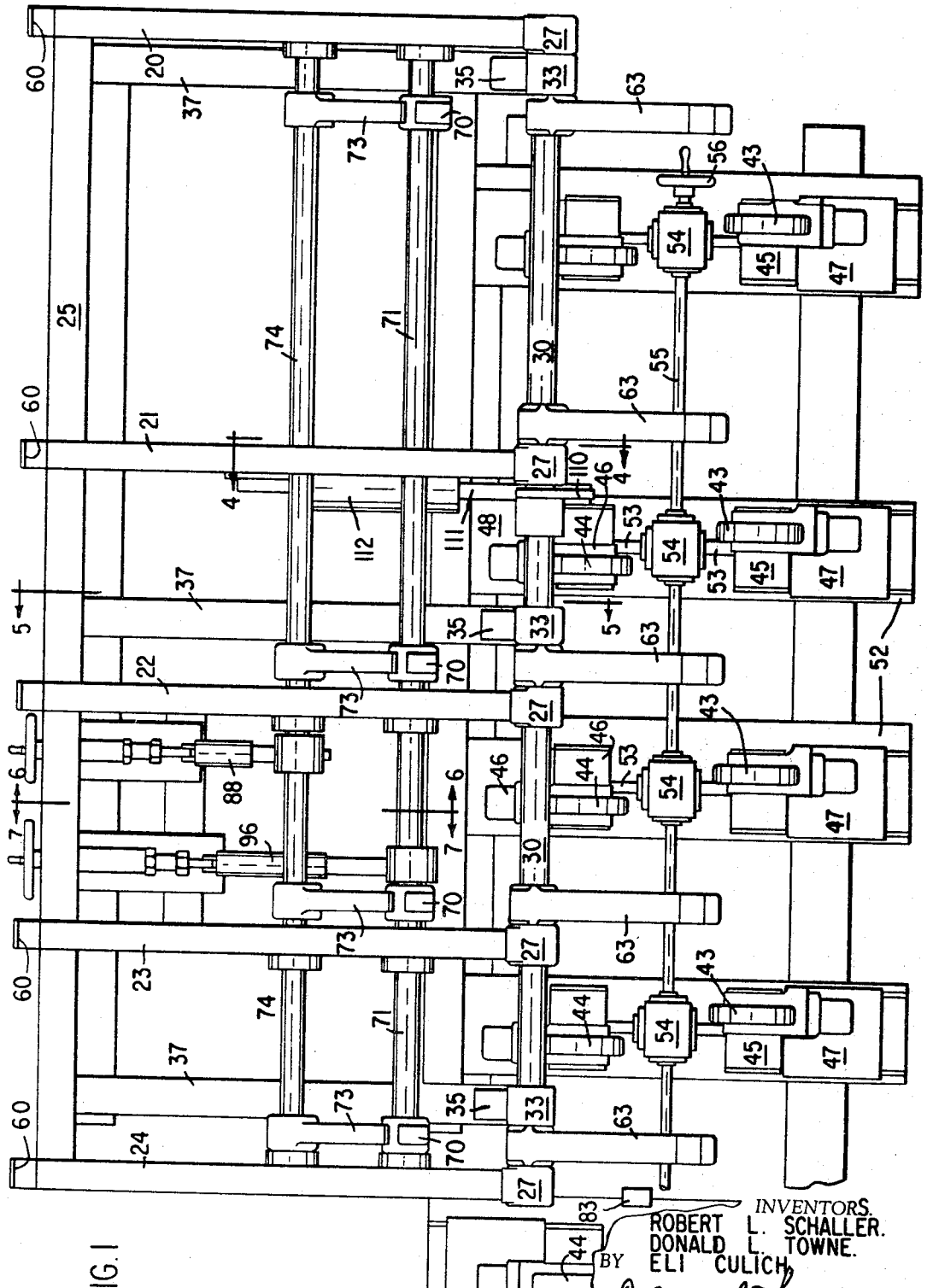

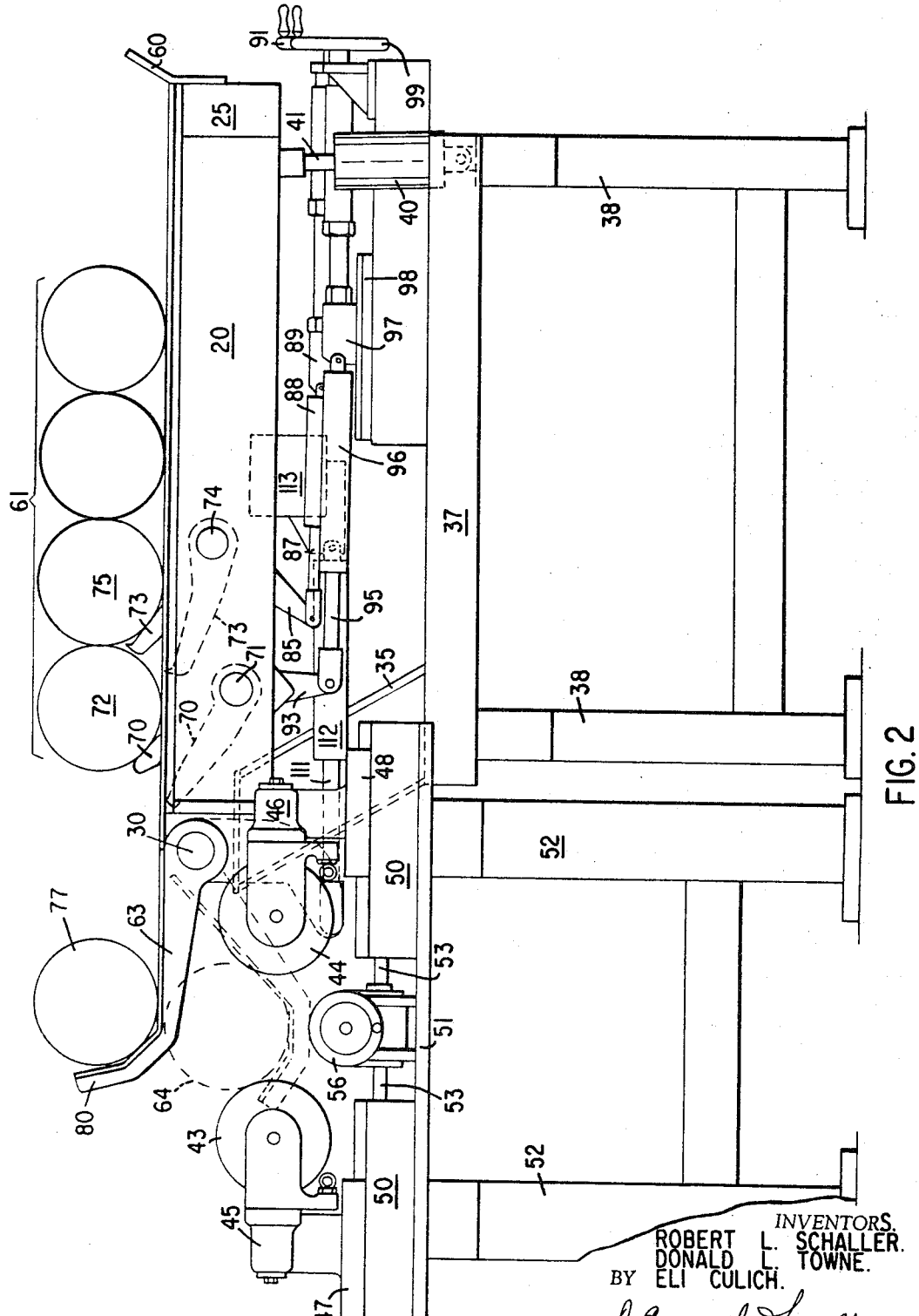

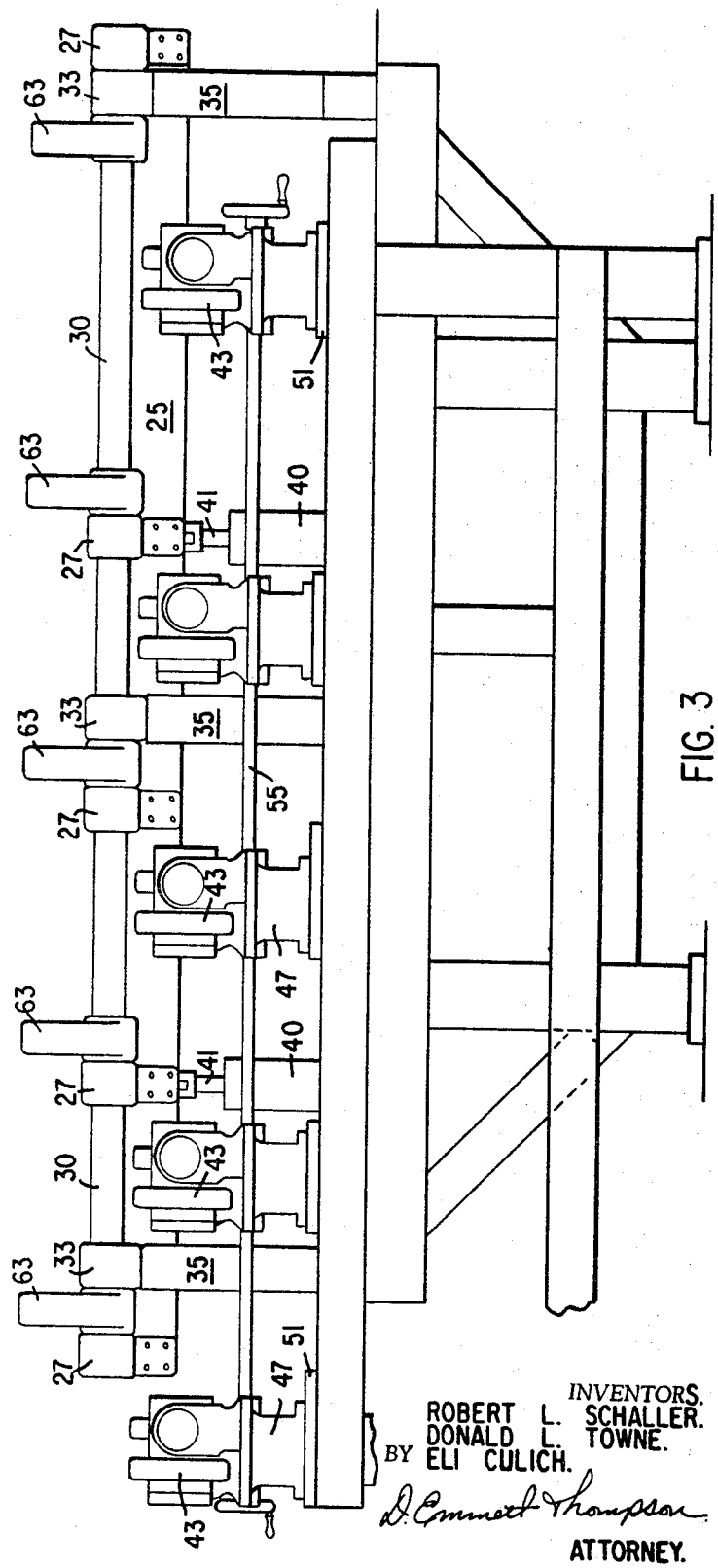

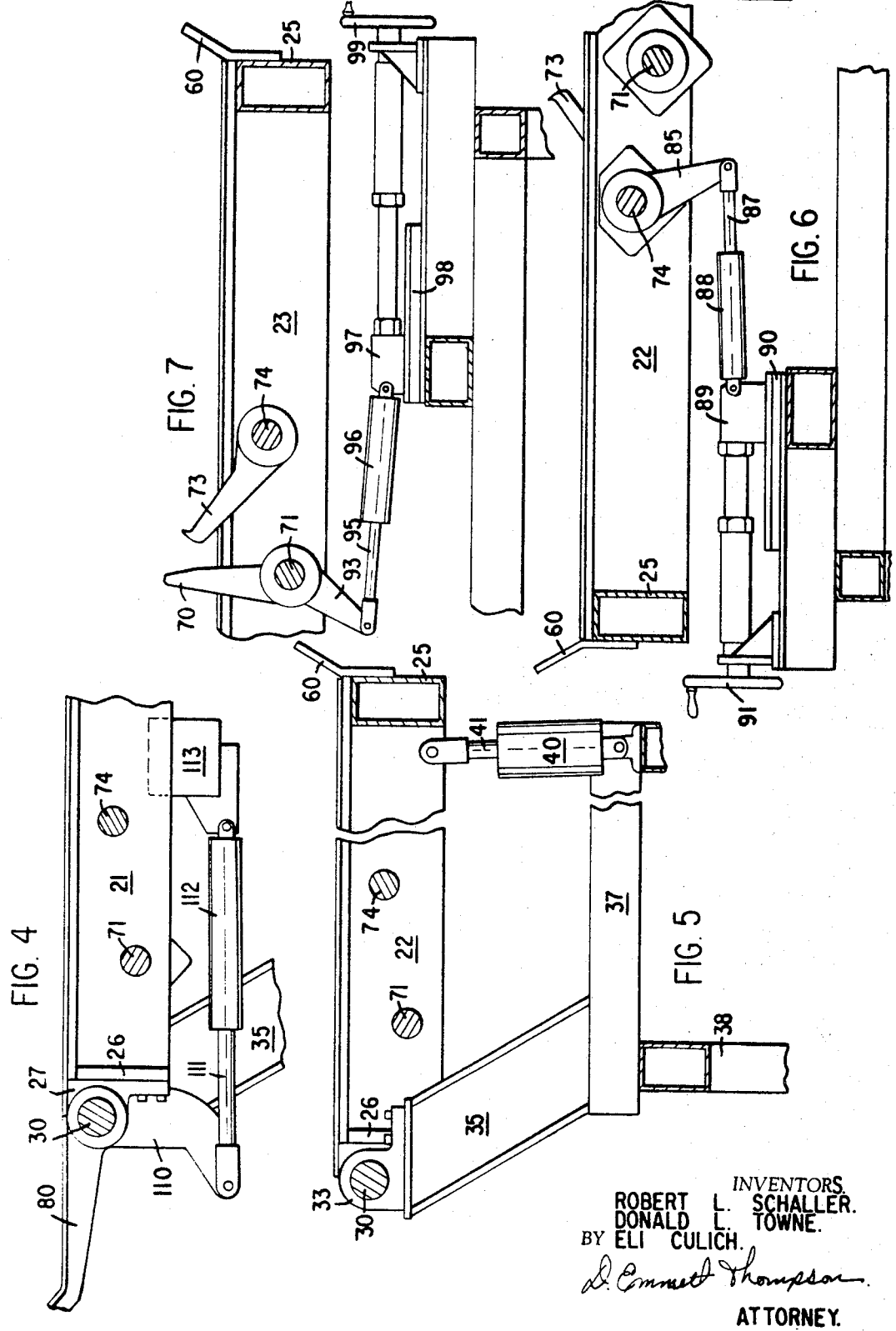

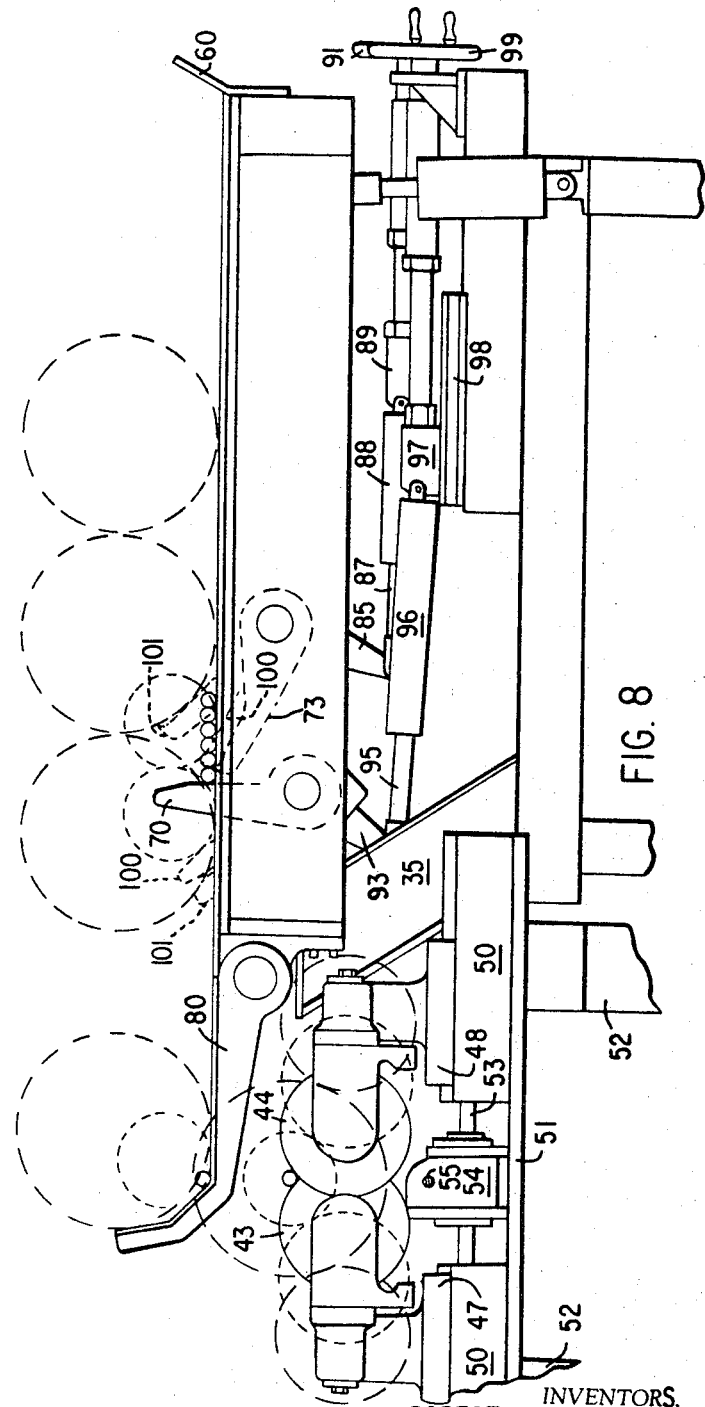

3,419,159
BAR LOADING APPARATUS
Robert L. Schaller, Camillus, Donald L. Towne, North Syracuse, and Eli Culich, Liverpool, N.Y., assignors to Sundstrand Corporation, Belvidere, Ill., a corporation of Illinois
Filed Dec. 30, 1966, Ser. No. 606,100
5 Claims. (Cl. 214—1)

ABSTRACT OF THE DISCLOSURE

A bar loader for handling bars varying in diameter over a substantial range. Restraining and stop levers are movable by power means above the plane of the supply rack. Each power means is adjustable to vary the up position of the levers for the accommodation of bars of different diameters.

---

This invention relates to bar loading apparatus for use in conjunction with bar working machines. At present, bar working machines, such as automatic screw machines, turret lathes, and particularly centerless grinders, are capable of working on bars which vary over a substantial range in diameter. Such machines are provided with bar feed mechanism and, on occasion, bar loading apparatus is employed to automatically load stock bars into the bar feed mechanism. However, such bar loaders are so constructed that it is a difficult and time consuming operation to adjust the loader to effect a change to render the loader operable to handle stock bars of a diameter varying greatly from the bars previously handled and in some instances, where a change is made to handle stock bars differing greatly in diameter from those previously handled, it is necessary to substitute different components in the loader.

This invention has as an object a stock bar loader capable of handling stock bars varying from a fraction of an inch in diameter to ten or more inches in diameter, the change being quickly and conveniently brought about by the simple manipulation of a pair of hand wheels.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a top plan view of a bar loader embodying our invention and including the contiguous portion of the bar feeder of the machine tool.

FIGURE 2 is an end elevational view looking to the left in FIGURE 1.

FIGURE 3 is a front elevational view.

FIGURE 4 is a view taken on line 4—4, FIGURE 1.

FIGURE 5 is a view taken on line 5—5, FIGURE 1.

FIGURE 6 is a view taken on line 6—6, FIGURE 1.

FIGURE 7 is a view taken on line 7—7, FIGURE 1.

FIGURE 8 is a view, similar to the upper portion of FIGURE 2, illustrating the adjustment of the stop levers and retaining levers to accommodate stock bars of varying diameters.

Centerless grinding machines are at present constructed to handle stock bars varying greatly in diameter, as from a fraction of an inch up to and including ten or more inches in diameter. Stock bar loaders, known to applicants, are not capable of handling stock bars having varying diameters of such magnitude by making a simple adjustment of the components of the loader. The stock bar loader of our invention includes means for quickly and conveniently adjusting the loader for the efficient handling of stock bars varying in diameter over the range indicated.

The loader consists of a plurality of beams 20, 21, 22, 23 and 24, secured at their rear ends to a member 25 and, at their forward ends, the beams are provided with a plate 26 to which there is affixed bearing blocks 27, see FIGURES 1 and 4. The bearing blocks 27 receive a shaft 30 which also extends through bearing blocks 33, see FIGURES 1, 3, 4 and 5, which are fixed to the upper end of forwardly inclined columns 35 extending upwardly from frame beams 37 which, in turn, are supported by leg structures 38, see FIGURES 2 and 5.

With this arrangement, the forward, or downstream, end of the rack is mounted for pivotal movement about the shaft 30. Fluid operated cylinders 40 are pivotally mounted at their lower ends on the frame structure and the piston rods 41 are pivotally connected to their upper ends, as to beams 21, 23. These piston and cylinder structures serve to vary the inclination of the rack downwardly toward the shaft 30.

The machine tool, as a centerless grinder, is provided with a bar feeder consisting of a plurality of pairs of rollers 43, 44. The rollers 43, 44, of each pair are rotated by motor units 45, 46. The motor units are mounted on slides 47, 48, slidably mounted on supporting blocks 50 mounted on a framework consisting of plates 51 and uprights 52. The framework 51, 52, is fixedly secured along the front edge of the framework 37, 38. The slides 47, 48, FIGURES 1 and 2, are connected by shafts 53 extending from gear housings 54. There is a gear housing 54 between each pair of the rolls 43, 44, and the gear housings are operatively connected together by a line shaft 55 provided at one end with a hand wheel 56. By rotation of the hand wheel 56, the motor units 45, 46, are moved toward and from each other to vary the distance between the rolls 43, 44, to accommodate stock bars of different diameters. The bar feeder per se forms s no part of this invention.

The rear ends of the beams 20–24 are provided with upwardly extending guards 60. A supply of stock bars 61 is positioned on the beams 20–24 of the rack. For stock bars of small diameter, the rear end of the rack is elevated by the cylinders 40 to increase the angle of inclination, so the stock bars, when released, will roll downwardly along the rack.

There are a series of load levers 63 spaced along the shaft 30 to which they are fixedly secured. The load levers extending forwardly from the shaft 30 and in the up position shown in full line, FIGURE 2, form a continuation of the rack at the lower or downstream end thereof. Upon oscillation of the shaft in a counter-clockwise direction FIGURE 2, the load levers 63 are moved downwardly, and the spacing between these levers is such that the levers move downwardly between the pairs of feed rolls 43, 44, see FIGURES 1 and 2. Accordingly, if a stock bar, as indicated at 64, is positioned on the levers 63, it is lowered to the dotted line position to rest on the feed rolls 43, 44, for advancement into the machine tool.

There are a series of stop levers 70 spaced along a shaft 71 and being fixedly secured thereto. These stop levers are movable upon oscillation of the shaft 71 in a counter-clockwise direction, FIGURE 2, from an up position, shown in full lines, to a down position, shown in dotted lines. In the up position, the ends of the levers 70 extend above the plane of the rack for engaging the lowermost bar 72 in the supply on the rack and prevent further downward movement of that bar.

There is a third series of retaining levers 73 spaced along a shaft 74 and being fixedly secured thereto. The retaining levers 73 are movable from a down position, shown in dotted outline FIGURE 2, to an up position shown in full lines above the plane of the load rack for engagement with the bar 75 which is next above the bar 72 engaged by the levers 70. With this arrangement, when the levers 70 are moved downwardly below the plane of the rack, the bar 72 may then roll downwardly and onto the load levers 63, as indicated by the bar 77 in FIGURE 2. The remainder of the bars on the load rack are prevented from moving downwardly by the levers 73.

The shaft 71 is located upstream from the shaft 30, and the shaft 74 upstream from the shaft 71, as is apparent.

The levers 63, 70 and 73 are operated through a cycle. At the initiation of the cycle, the levers 73 are moved downwardly to permit the lowermost bar in the rack to move against the levers 70. The levers 73 are then returned to up position to prevent movement of the remaining bars in the supply. The levers 70 are then moved downwardly to permit the bar, indicated at 72, FIGURE 2, to roll onto the load levers 63, the forward free ends of which are bent upwardly, as at 80, to retain the bar on the levers. The levers 63 are then moved downwardly to deposit the bar on the feed rolls 43, 44. When the bar has been fed into the machine tool and the trailing end of the bar has passed a detector 83, FIGURE 1, the levers 73, 70, 63, are operated through the cycle for the deposit of another bar onto the feed rolls 43, 44.

An arm 85 is fixedly secured to the shaft 74, FIGURES 2 and 6. The lower end of this arm is pivotally connected to a piston rod 87 mounted in a cylinder 88 pivotally mounted on a slide block 89. The slide block is adjustable in a direction axially of the cylinder on a supporting way 90. This adjustment is made by rotation of the hand wheel 91. The piston rod 87 has a fixed stroke. Accordingly, the up and down limit positions of the levers 73 may be varied by operation of hand wheel 91.

An arm 93 is fixed to and depends from the shaft 71, and is connected to a piston rod 95 movable in a cylinder 96. The cylinder 96 is pivotally connected to a slide block 97 movable on a guideway 98 by manipulation of a hand wheel 99. This arrangement, similar to that described in connection with the adjusting mechanism for levers 73, effects variation of the up and down positions of the levers 70.

Referring to FIGURE 8, the levers 70, 73, are shown in their up position when the loader is supplied with bars of small diameter. The up position of these levers is varied by hand wheels 91, 99, to the positions shown in dotted line at 100 for bars of larger diameter, and to the up positions shown at 101 for bars of still larger diameters. It will be understood that the feed rollers 43, 44, are adjusted by operation of the hand wheel 56 to effect the proper spacing between the feed rollers to accommodate the size bar being processed by the machine.

An arm 110 is fixed to the shaft 30 and is pivotally connected to piston rod 111 movable in cylinder 112. The cylinder 112 is pivotally connected to a supporting plate 114 fixed to the beam 21, see FIGURE 4. With this arrangement, load levers 80 are moved to up and down positions upon application of fluid alternatively to the ends of the cylinder 112. The cylinders 88, 98 and 112 are energized by any suitable cycle timer initiated in its cyclic operation by the detector 83.

It will be apparent that our bar loader is quickly and conveniently adjusted by manipulation of the hand wheels 91, 99, to accommodate stock bars varying over a large range in diameters.

What we claim is:

1. Bar loading apparatus for successively separating stock bars from a supply and delivering the same to the bar feeder of a machine tool, the feeder consisting of a row of spaced apart pairs of power driven rolls, the rolls of each pair being spaced apart laterally and adjustable to receive the support bars of varying diameter, said bar loading apparatus comprising a rack inclining downwardly toward the feeder and adapted to support a supply of bars, a series of load levers fixedly mounted in spaced relation along a shaft journalled for oscillation about an axis extending in parallel relation to the bars in said supply and said feeder, said load levers being movable upon oscillation between up and down positions, said load levers in the up position forming a continuation of said rack at the downstream end thereof and extending above said feeder, said load levers being movable upon oscillation of said shaft to down position intermediate the rolls of the feeder for depositing a bar on said rolls, a series of stop levers fixedly mounted in spaced relation along a shaft located upstream from said load levers and journalled for oscillation about an axis extending parallel to said first shaft, a series of bar retaining levers fixedly mounted in spaced apart relation along a third shaft located upstream of the rack from said second shaft, said stop levers and said retaining levers being movable upon oscillation of said second and third shafts from a down position below the plane of said rack to an up position above said plane for engagement with the bars on said rack, power means operable to move said retaining levers downwardly for the release of the lowermost bar in said supply to permit said bar to move against said stop levers and to return said retaining levers to up position for engagement with the bar next above said released lowermost bar, a second power means operable to effect movement of said stop levers to down position for release of said bar to permit downward movement thereof onto said load levers and to return said stop levers to up position, a third power means operable to effect downward movement of said load levers for deposit of said bar thereon into said feeder, and means operable to adjust the up positions of said stop levers and said retaining levers to accommodate a bar of predetermined diameter between said levers.

2. A bar loading apparatus as defined in claim 1, including means for pivotally supporting the downstream end of said rack, and power means operable to move said rack about said pivotal mounting to vary the inclination of said rack.

3. A bar loading apparatus as defined in claim 1, wherein said second and third shafts are journalled in said rack, and fluid operated means are connected to said shafts respectively for effecting oscillation thereof.

4. A bar loading apparatus for successively separating stock bars from a supply and delivering the same to the bar feeder of a machine tool, said bar loading apparatus comprising a rack structure inclining downwardly toward the feeder and adapted to support a supply of bars, a series of load levers fixedly mounted in spaced relation along a shaft journalled for oscillation about an axis extending in parallel relation to the bars in said supply and said feeder, said load levers in the up position forming a continuation of said rack at the downstream end thereof and extending above said feeder, said load levers being movable upon oscillation of said shaft to down position for depositing a bar on said feeder, a series of stop levers fixedly mounted in spaced apart relation along a second shaft journalled in said rack structure upstream from said load levers for oscillation about an axis extending parallel to said first shaft, a series of bar retaining levers fixedly mounted in spaced apart relation along a third shaft located upstream of the rack from said second shaft, said stop levers and said retaining levers being movable upon oscillation of said second and third shafts from a down position below the plane of said rack structure to an up position above said plane for engagement by bars on said rack structure, a power means carried by said rack structure and being operatively connected to each of said second and third shafts and operable to effect oscillation of said shafts for movement of the levers carried thereby through an arc of predetermined extent, and means operable to adjust each of said power means in a direction perpendicular to the axes of said shafts to vary the up and down positions of said levers.

5. A bar loading apparatus as set forth in claim 4, wherein the power means for operating said second and third shafts consists of cylinder and piston structures.

References Cited

UNITED STATES PATENTS 2,710,104  6/1955  Putnam.
2,763,236  9/1956  Cummings.
2,977,276  3/1961  Colliva.

GERALD M. FORLENZA, *Primary Examiner.*

F. E. WERNER, *Assistant Examiner.*

U.S. Cl. X.R.

214—91